(12) United States Patent
Kenmotsu et al.

(10) Patent No.: US 8,667,864 B2
(45) Date of Patent: Mar. 11, 2014

(54) POWER TRANSMISSION APPARATUS

(75) Inventors: Kazuto Kenmotsu, Tochigi (JP);
Atsushi Oda, Tochigi (JP); Masayuki Sayama, Tochigi (JP); Yoshiyuki Nakabayashi, Tochigi (JP)

(73) Assignee: GKN Driveline Torque Technology KK, Tochigi-shi (JP)

( * ) Notice: Subject to any disclaimer, the term of this patent is extended or adjusted under 35 U.S.C. 154(b) by 1207 days.

(21) Appl. No.: 11/983,630

(22) Filed: Nov. 9, 2007

(65) Prior Publication Data

US 2008/0113843 A1    May 15, 2008

(30) Foreign Application Priority Data

Nov. 10, 2006  (JP) ................... 2006-305238
Jul. 11, 2007  (JP) ................... 2007-182233
Aug. 24, 2007  (JP) ................... 2007-218981

(51) Int. Cl.
*F16H 48/06* (2006.01)
*F16J 15/00* (2006.01)
*B60K 17/34* (2006.01)
*F16H 57/029* (2012.01)
*F16H 57/038* (2012.01)

(52) U.S. Cl.
CPC .............. B60K 17/34 (2013.01); F16H 57/029 (2013.01); F16H 57/038 (2013.01)
USPC ........... 74/606 R; 475/198; 475/230; 180/249

(58) Field of Classification Search
USPC ................. 74/606 R; 180/249; 475/198, 230; 368/220
See application file for complete search history.

(56) References Cited

U.S. PATENT DOCUMENTS

| 3,792,578 | A | * | 2/1974 | Hetzel ........................ 368/220 |
| 5,024,122 | A | * | 6/1991 | Parzl et al. ................. 74/606 R |
| 5,203,750 | A | * | 4/1993 | Oster et al. ................. 475/230 |
| 5,450,921 | A |   | 9/1995 | Kameda et al. |
| 6,070,495 | A | * | 6/2000 | Kuroda et al. ................ 74/650 |
| 8,042,431 | B2 | * | 10/2011 | Nakata et al. ............. 74/606 R |
| 2002/0128108 | A1 | * | 9/2002 | Jolliff et al. ................ 475/198 |
| 2004/0235605 | A1 |   | 11/2004 | Cook et al. |
| 2006/0032692 | A1 | * | 2/2006 | Ima et al. .................... 180/249 |

FOREIGN PATENT DOCUMENTS

| EP | 1 625 965 | 2/2006 |
| GB |     01542 | 4/1910 |
| GB |    848746 | 9/1960 |
| JP | 62-59130  | 3/1987 |
| JP | 62-080361 | 4/1987 |

(Continued)

OTHER PUBLICATIONS

Translation of JP 2-5641, Kitajo Yasuo et al., Jan. 16, 1990.*

(Continued)

*Primary Examiner* — Vinh Luong
(74) *Attorney, Agent, or Firm* — Jordan and Hamburg LLP

(57) ABSTRACT

In order to avoid competition with other components for a space, to thereby improve the degree of designing freedom, the power transmission apparatus includes a transfer case housing and supporting a ring gear and a pinion gear that orthogonally mesh with each other and form an orthogonal gear set, the transfer case is divided into a first case part and a second case part along a division plane that extends along an axis of rotation of the ring gear, and the first and second case parts are fixed together along the division plane with bolts.

4 Claims, 14 Drawing Sheets

(56) References Cited

FOREIGN PATENT DOCUMENTS

| | | |
|---|---|---|
| JP | 01-262222 | 10/1989 |
| JP | 2-266150 * | 10/1990 |
| JP | 2000-065191 | 3/2000 |
| JP | 2004-314796 | 11/2004 |
| JP | 2010-32016 * | 2/2010 |

OTHER PUBLICATIONS

English Abstract of JP 2010-32016, Nakada, Feb. 12, 2010.*

* cited by examiner

POWER TRANSMISSION APPARATUS

BACKGROUND OF THE INVENTION

1. Field of the Invention

The present invention relates to a power transmission apparatus installed in, for example, a vehicle.

2. Description of Related Art

In Japanese Unexamined Patent Application Publication No. S62-59130, a conventional power transmission apparatus, in particular, a peripheral structure of the power transmission apparatus is disclosed.

The conventional power transmission apparatus includes a transfer case having a case body and a case end part. The case body and case end part are attached to each other in a front-wheel axle and are fixed to each other at a periphery of the transfer case with bolts extended in parallel with the front-wheel axle.

Namely, each of the case body and case end part is provided with an attaching structure, to be fastened with the bolts, on the periphery thereof. According to this configuration, the attaching structures of the case body and case end part protrude from the transfer case in a radial direction away from the front-wheel axle. As a result, the outwardly protruding attaching structures interfere with peripheral components such as an engine or compete with the peripheral components for a space, to deteriorate the degree of designing freedom.

SUMMARY OF THE INVENTION

An object of the present invention is to provide a power transmission apparatus capable of avoiding competition with other components for a space and improving the degree of designing freedom.

In order to accomplish the object, an aspect of the present invention provides a power transmission apparatus including a case configured to house and support first and second gears that orthogonally mesh with each other and form an orthogonal gear set. The case is divided into a first case part and a second case part along a division plane that extends along an axis of rotation of the first gear, the first and second case parts being fixed together on the division plane with fixing units.

This aspect of the present invention eliminates a need of radially protruding structures for attaching bolts to be formed around the case, to avoid competition with other components for a space and improve the degree of designing freedom.

DETAILED DESCRIPTION OF EMBODIMENTS

The present invention avoids competition with other components for a space and improves the degree of designing freedom by dividing a case into first and second case parts along a division plane that extends along an axis of rotation of a first gear.

First Embodiment

Four-Wheel-Drive Vehicle

Figure 1:
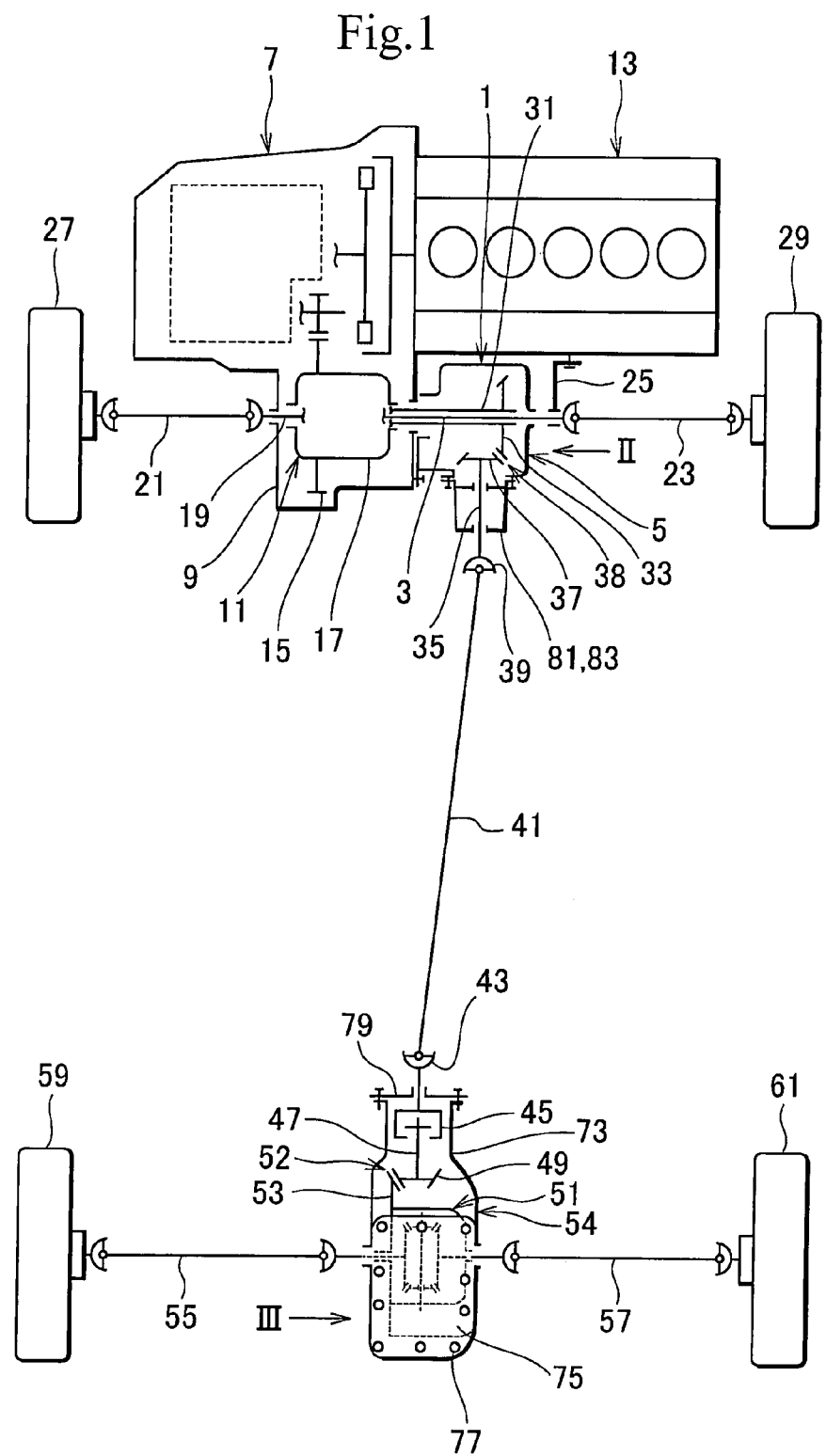
FIG. 1 is a plan view schematically showing a four-wheel-drive vehicle in which a power transmission apparatus according to a first embodiment of the present invention is installed.
Figure 2:
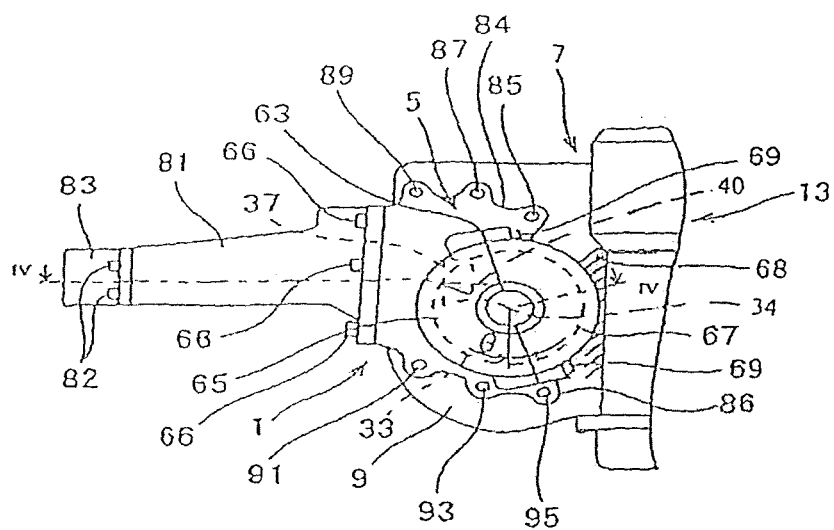
FIG. 2 is a view seen from an arrow II of FIG. 1.
Figure 3:
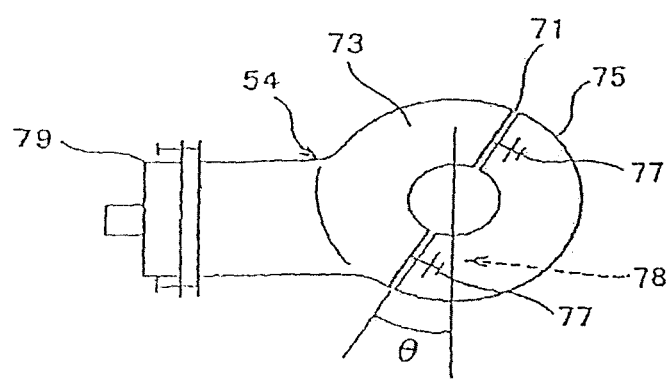
FIG. 3 is a view seen from an arrow III of FIG. 1.

FIG. 1 is a plan view schematically showing a four-wheel-drive vehicle in which a power transmission apparatus according to a first embodiment of the present invention is installed, FIG. 2 is a view seen from an arrow II of FIG. 1, and FIG. 3 is a view seen from an arrow III of FIG. 1.

In FIG. 1, the power transmission apparatus 1 is arranged around an intermediate shaft 3 that is a rotary shaft for one of front wheels. The power transmission apparatus 1 has a case, i.e., a transfer case 5 that is attached to a bell housing 9 of a transmission 7 corresponding to a fixed lateral.

In the bell housing 9, a front differential gear 11 is supported. The front differential gear 11 receives torque from an engine 13 through the transmission 7. The torque is transmitted from a ring gear 15 to a differential case 17.

The front differential gear 11 has left and right side-gears serving as output parts that are connected to intermediate shafts 19 and 3, respectively. The intermediate shafts 19 and 3 are connected to left and right front-wheel axles 21 and 23, to thereby connect the front differential gear 11 to the front-wheel axles 21 and 23.

The torque of the front differential gear 11 is transmitted through the intermediate shafts 19 and 3 to the front-wheel axles 21 and 23.

The power transmission apparatus 1 distributes the torque from the front differential gear 11 to a rear wheel side. The transfer case 5 of the power transmission apparatus 1 passes therethrough the intermediate shaft 3. The intermediate shaft 3 protrudes from the transfer case 5 toward the front-wheel axle 23 and is supported with a bearing mechanism 25 that is outside the transfer case 5 and is supported by the engine 13 as an adjacent member. The front-wheel axles 21 and 23 are connected to left and right front wheels 27 and 29, respectively. The bearing mechanism 25 may support the axle 23 instead of the intermediate shaft 3.

In the transfer case 5, a hollow shaft 31 extends axially. An end of the hollow shaft 31 is connected to the differential case 17 of the front differential gear 11. The hollow shaft 31 passes therethrough the intermediate shaft 3 and is provided with a ring gear 33 corresponding to a first gear. The ring gear 33 meshes with a pinion gear 37 corresponding to a second gear. The pinion gear 37 is attached to a rear output shaft 35.

The ring gear 33 and pinion gear 37 are bevel gears that orthogonally mesh with each other to form an orthogonal gear set 38. The pinion gear 37 is offset upwardly in a vertical direction with respect to the ring gear 33. The pinion gear 37 may be offset downwardly in a vertical direction with respect to the ring gear 33.

The rear output shaft 35 is connected through a universal joint 39 to a propeller shaft 41. The propeller shaft 41 is connected through a universal joint 43 and a 4WD on-demand torque transmission coupling 45 to a drive pinion shaft 47. The drive pinion shaft 47 has a drive pinion gear 49 also corresponding to the second gear. The drive pinion gear 49 meshes with a ring gear 53 of a rear differential gear 51. The ring gear 53 also corresponds to the first gear.

The ring gear 53 and drive pinion gear 49 orthogonally mesh with each other and form an orthogonal gear set 52. The orthogonal gear set 52 is housed in and supported by a carrier case 54.

The rear differential gear 51 is supported by the carrier case 54 and is connected through left and right rear-wheel axles 55 and 57 to rear wheels 59 and 61.

Torque from the engine 13 is transmitted through the transmission 7 to the ring gear 15 of the front differential gear 11. The torque is then transmitted through the intermediate shafts 19 and 3 and front-wheel axles 21 and 23 to the left and right front wheels 27 and 29. At the same time, the torque is transmitted through the differential case 17, hollow shaft 31, ring gear 33, and pinion gear 37 to the rear output shaft 35.

From the rear output shaft 35, the torque is transmitted through the universal joint 39, propeller shaft 41, universal joint 43, torque transmission coupling 45, drive pinion shaft 47, and drive pinion gear 49 to the ring gear 53 of the rear differential gear 51. From the rear differential gear 51, the torque is transmitted through the rear axles 55 and 57 to the rear wheels 59 and 61.

The transmitted torque drives the front and rear wheels 27, 29, 59, and 61 so that the vehicle may run in a four-wheel-drive state.

Divided Case Structure

As shown in FIG. 2, the transfer case 5 is divided along a division plane 63 that extends along an axis of rotation 34 of the first/ring gear 33, into a first case part 65 and a second case part 67 such that the axis of rotation 34 of the first gear 33 extends onto the division plane 63 in the direction of the axis of rotation 34 of the first gear 33 whereas the axis of rotation 40 of the second gear 37 traverses the division plane 63 in the direction of the axis of rotation 40 of the second gear 37, and thus does not so extend onto the division plane 63 in said direction of the axis of rotation 34 of the first gear 33. The first and second case parts 65 and 67 are fixed together on the division plane 63 with bolts 69 corresponding to fixing units.

According to the first embodiment, the division plane 63 is inclined relative to a vertical direction such that an upper part of the division plane 63 is inclines toward a front end face of the pinion gear 37 of the rear output shaft 35. As a result, the first and second case parts 65 and 67 are inclined by θ degrees relative to the vertical direction and are fixed together with the bolts 69. This arrangement prevents the power transmission apparatus 1 from protruding in a radial direction away from the front-wheel axle, i.e., protruding into a space 68 between the engine 13 and the second case part 67.

Similarly, in FIG. 3, the carrier case 54 on the rear side of the vehicle is divided along a division plane 71 that extends along an axis of rotation of the ring gear 53, into a first case part, i.e., a case body 73 and a second case part, i.e., a case cover 75. The case body 73 and case cover 75 are fixed together on the division plane 71 with bolts 77.

According to the first embodiment, the division plane 71 is inclined relative to a vertical direction such that an upper part of the division plane 71 is inclined toward a front end face of the drive pinion gear 49 of the drive pinion shaft 47.

The case body 73 houses the torque transmission coupling 45 and is fixed to an input case part 79.

The carrier case 54 has through openings that are used when transmitting torque from the universal joint 43 to the left and right rear axles 55 and 57. A predetermined amount of oil is sealed inside the carrier case 54. The case cover 75 includes a main part of an oil tank 78.

The bolts 77 are arranged at positions that are inclined by θ degrees relative to a vertical direction. This arrangement prevents the carrier case 54 from protruding in a radial direction away from the rear-wheel axle, i.e., protruding in a front-rear direction of the vehicle.

Power Transmission Apparatus

Figure 4:
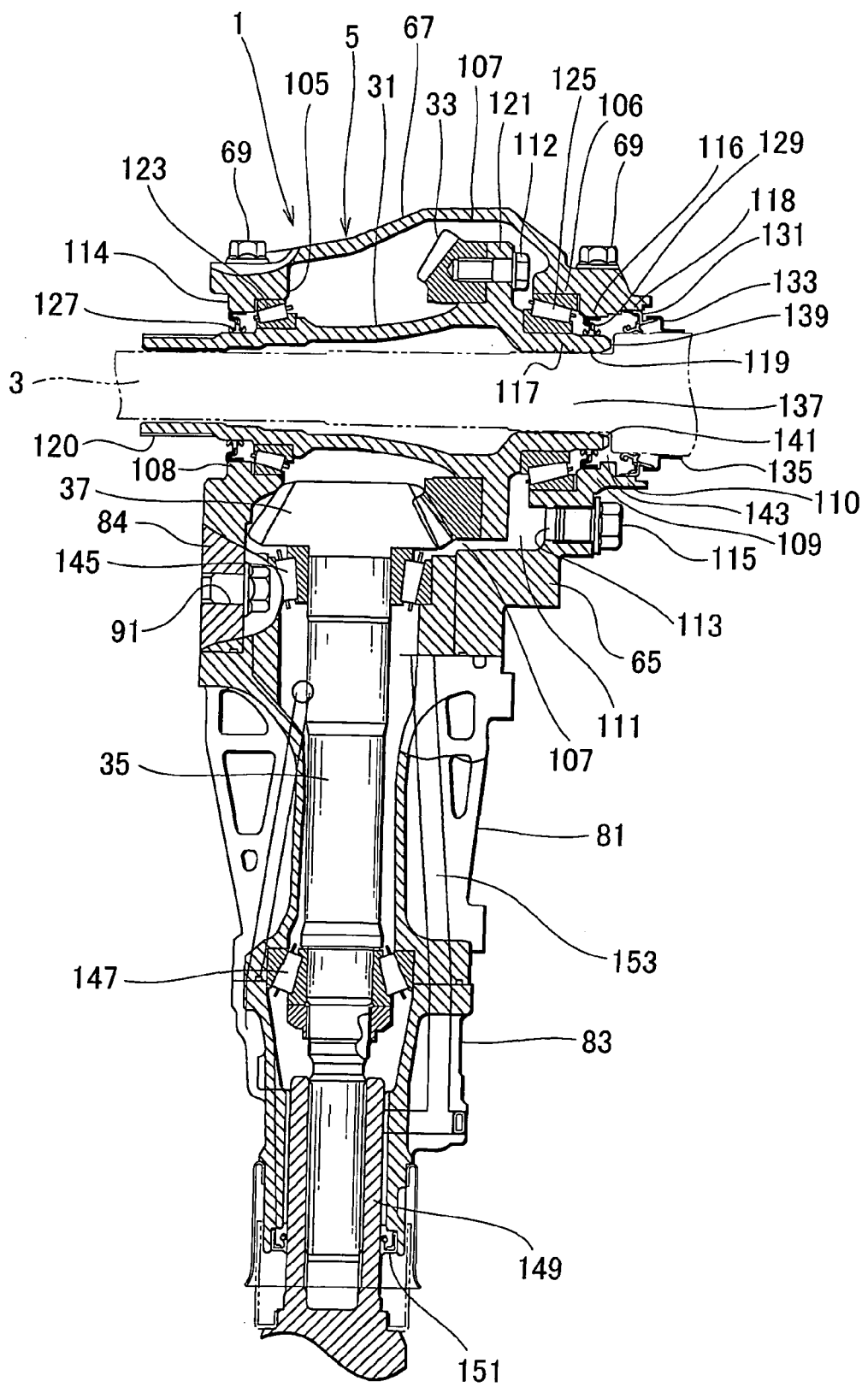
FIG. 4 is a sectional plan view taken along lines IV-IV of FIG. 2 and showing the power transmission apparatus according to the first embodiment.
Figure 5:
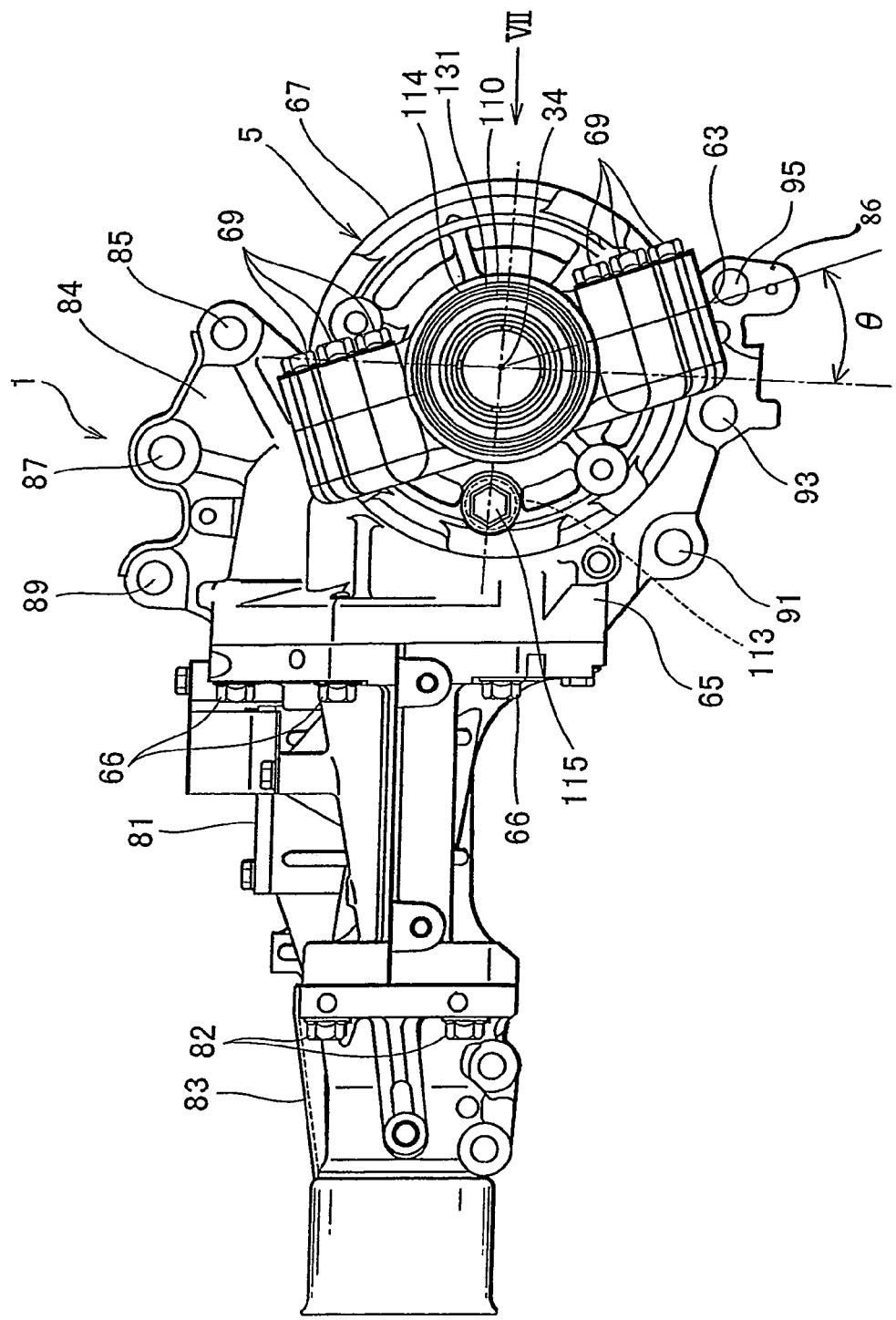
FIG. 5 is a right side view showing the power transmission apparatus of FIG. 4.
Figure 6:
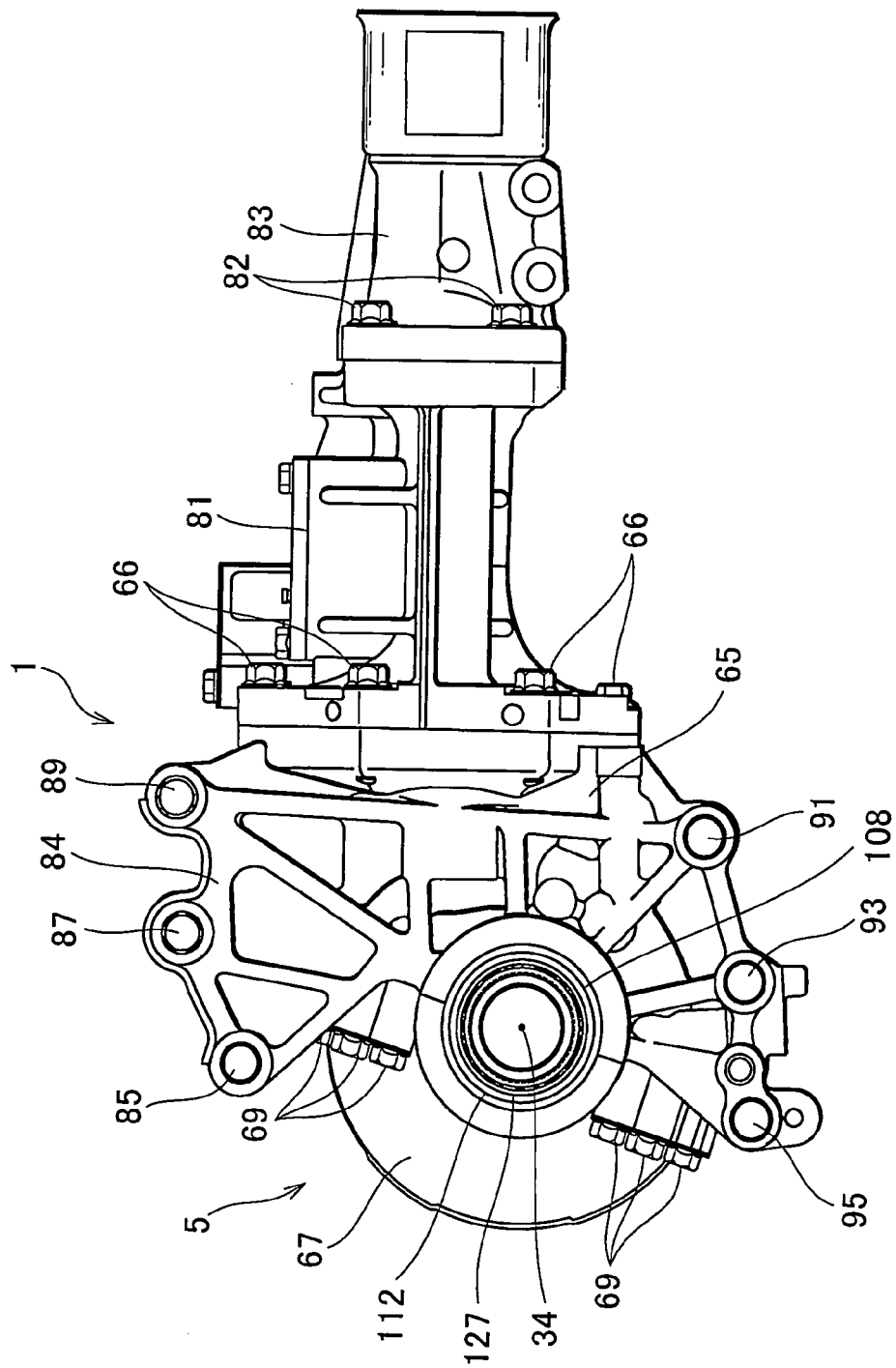
FIG. 6 is a left side view showing the power transmission apparatus of FIG. 4.
Figure 7:
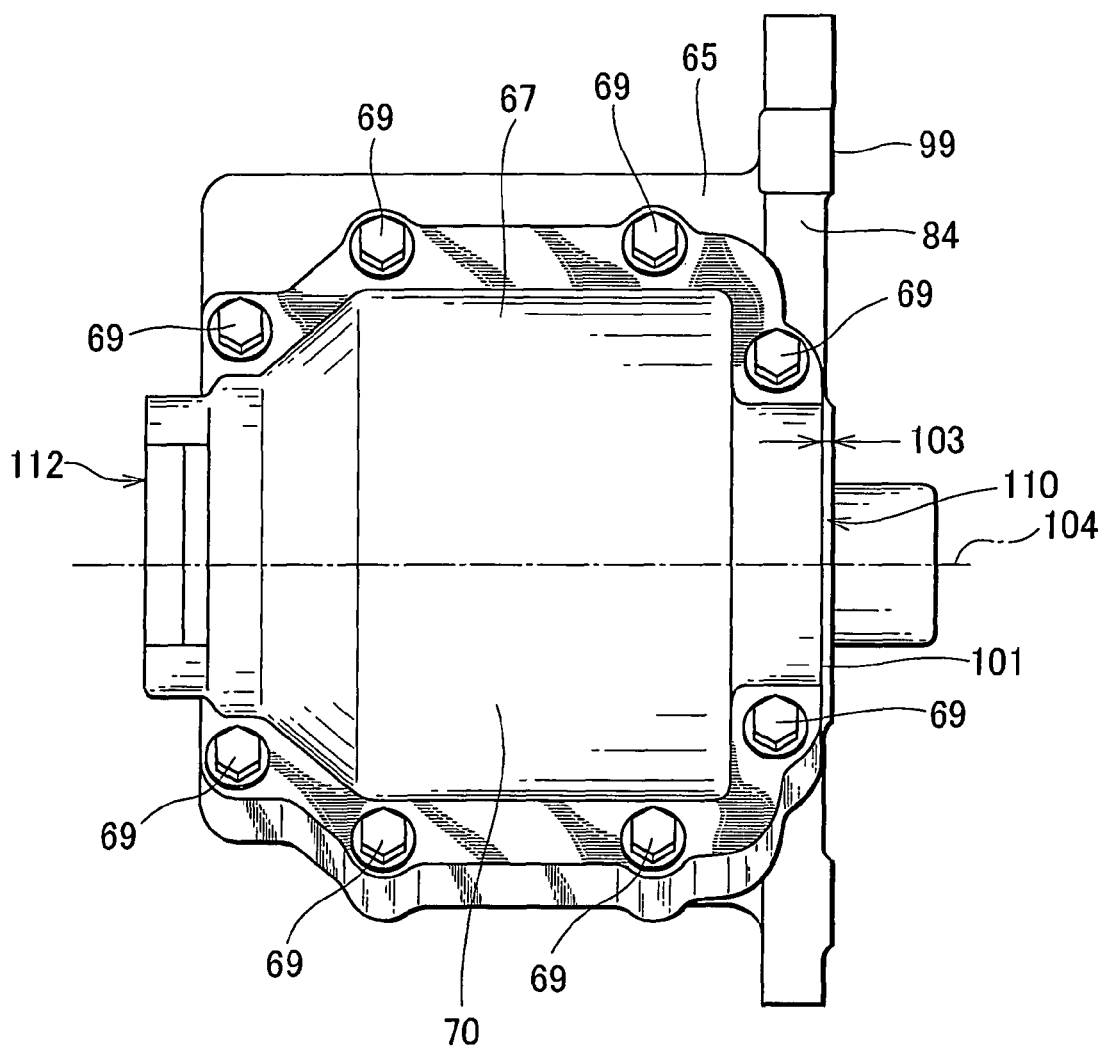
FIG. 7 is a view seen from an arrow VII of FIG. 5.

FIG. 4 is a sectional plan view showing the power transmission apparatus 1, FIG. 5 is a right side view showing the apparatus 1, FIG. 6 is a left side view showing the apparatus 1, and FIG. 7 is a view seen from an arrow VII of FIG. 5.

In FIGS. 4 to 7, the power transmission apparatus 1 according to the first embodiment distributes torque transmitted to the front differential gear 11 (FIG. 1) to the rear wheels 59 and 61 (FIG. 1). The intermediate shaft 3 passes and is supported by the transfer case 5 of the power transmission apparatus 1. An end of the intermediate shaft 3 engages through splines with the side-gear of the front differential gear 11.

The first and second case parts 65 and 67 of the transfer case 5 are fixed together with the bolts 69 as mentioned above. Not to interfere with the ring gear 33 and hollow shaft 31, the bolts 69 are arranged on each side of a rotational axis 104, to secure a sufficient fixing force. An axis of each bolt 69 intersects with, i.e., is orthogonal to the center axis of the ring gear 33 and is oriented toward the first case part 65.

With this arrangement, heads of the bolts 69 and the periphery of the second case part 67 where the bolts 69 are fixed do not protrude outwardly, to thereby suppress competition with other components such as the engine 13 for a space. The heads of the bolts 69 are located on or close to the inside of the contour of the second case part 67, so that the heads of the bolts 69 may be prevented from protruding from the contour of the second case part 67.

The transfer case 5 includes a third case part 81 and a fourth case part 83 as shown in FIGS. 4 to 7. The third case part 81 is opposite to the second case part 67 and is fixed to the first case part 65 with bolts 66. The fourth case part 83 is fixed to the third case part 81 with bolts 82.

The first case part 65 has a flange 84 as an attaching portion. The flange 84 is formed at an outer end of the first case part 65 away from the ring gear 33 and is extended in a direction orthogonal to the axis of rotation of the ring gear 33. The flange 84 has bolt holes 85, 87, 89, 91, 93, 95, and the like.

The flange 84 includes an extension 86 that extends over the division plane 63 toward the second case part 67 as shown in FIG. 5. In FIG. 7, an end face 101 of the second case part 67 is retracted in the axial direction of the ring gear 33 from an abutting face 99 of the flange 84 of the first case part 65 by a distance 103.

The flange 84 of the first case part 65 of the transfer case 5 is attached to a wall of the bell housing 9 and is fixed thereto with bolts passed through the bolt holes 85, 87, 89, 91, 93, 95, and the like.

Part of the flange 84 that is the extension 86 extending toward the second case part 67 is fixed to the bell housing 9 with the bolts passed through the bolt holes 85 and 95. This configuration can surely fix the transfer case 5 as a whole to the bell housing 9 and can thereby prevent vibration of the transfer case 5 during power transmission.

The second case part 67 is separated by the distance 103 from the wall of the bell housing 9, so that the transfer case 5 is surely attached to the bell housing 9.

In this way, the first case part 65 has the flange 84 to be attached to the fixed lateral (bell housing 9) and the second case part 67 is attached through the first case part 65 to the bell housing 9.

Returning to FIG. 4, the first and second case parts 65 and 67 of the transfer case 5 have bearing supports 105 and 106 as supports for supporting the ring gear 33 corresponding to the first gear. The first case part 65 has a space 107 for receiving the pinion gear 37. The transfer case 5 has seal supports 108, 109, and 110.

The first case part 65 has a bottom space 111 at a lowermost position of the first case 5 in a gravitational direction. The bottom space 111 serves as a main part for storing oil sealed inside the power transmission apparatus 1. The first case part 65 has an opening 113 having a filler plug 115 to close the opening 113 to seal the apparatus 1. The opening 113 is used to pour oil into the apparatus 1. Providing the first case part 65 with the opening 113 and auxiliary parts such as the filler plug 115 and a drain plug (not shown, corresponding to a drain plug 114 of a second embodiment) results in a simple structure principally involving strength of the second case part 67. As a result, the second case part 67 does not compete with other parts such as the engine 13 for a space, to thereby improve the degree of designing freedom.

The first case part 65 of the transfer case 5 passes therethrough the hollow shaft 31 that extends from the differential case 17 of the front differential gear 11.

A first end of the hollow shaft 31 has splines 120 on an outer periphery thereof and a second end thereof has an inner circumferential centering part 117. The centering part 117 conducts centering of the intermediate shaft 3. The centering part 117 has a spiral groove 119 to axially guide oil.

An intermediate part of the hollow shaft 31 is provided with a flange 121 to which the ring gear 33 is fixed with bolts 112.

The ring gear 33 is hollow so that the ring gear 33 supports the intermediate shaft 3 through the centering of the intermediate shaft 3 with the centering part 117 on an inner circumferential side of the ring gear 33. The ring gear 33 may be fixed to the hollow shaft 31 by welding, pressurized insertion, shrinkage fit, adhesion, spline engagement, and the like. Axial positions of the ring gear 33 and hollow shaft 31 may be fixed with the use of snap rings and the like.

The hollow shaft 31 is supported by taper roller bearings 123 and 125 that are supported by the bearing supports 105 and 106 of the first and second case parts 65 and 67.

Axially adjacent to the taper roller bearings 123 and 125, an oil seals 127 and 129 are arranged, respectively. An outer circumferential face of the oil seals 127 and 129 are positionally restricted by the seal supports 108 and 109 of the first case part 65 and the seal supports 114 and 116 of the second case part 67. An inner circumferential face of each of the oil seals 127 and 129 has a lip that relatively slides along an outer circumferential face of the hollow shaft 31. Axially outwardly adjacent to the oil seal 129, an oil seal 131 is arranged between the intermediate shaft 3 and the seal supports 110 and 118 of the first and second case parts 65 and 67. On an axial outer side of the oil seal 131, a dust cover 133 is attached to the intermediate shaft 3. The seal supports 108 and 109 are formed in semicircular shapes on the inner circumferential face of the first case part 65 and have the same diameter. The seal supports 114 and 116 are formed in semicircular shapes on the inner circumferential face of the second case part 67 and have the same diameter. The seal supports 110 and 118 are formed in semicircular shapes and have the same diameter that is larger than the diameter of the seal supports 109 and 116.

The oil seal 131 relatively slides along a large diameter part 135 of the intermediate shaft 3. The large diameter part 135 is larger than the diameter of an intermediate part 137 of the intermediate shaft 3 corresponding to the centering part 117 of the hollow shaft 31 and axially faces an end 139 of the hollow shaft 31. An end face of the hollow shaft 31 is provided with a groove 141 that communicates with a space 143 formed between the oil seals 129 and 131.

The rear output shaft 35 is supported by the third case part 81 of the transfer case 5 through taper roller bearings 145 and 147.

The fourth case part 83 covers an end of the rear output shaft 35 having the pinion gear 37. The fourth case part 83 accommodates a member 149 of the universal joint 39. Between the fourth case 83 and the member 149, an oil seal 151 is interposed.

An oil path 153 is formed through the third and fourth case parts 81 and 83.

Power Transmission

Torque supplied to the differential case 17 of the front differential gear 11 is transmitted to the left and right side-gears, and at the same time, is distributed to the hollow shaft 31, ring gear 33, pinion gear 37, and rear output shaft 35.

From the side-gears of the front differential gear 11, the torque is transmitted through the intermediate shafts 19 and 3 to the front-wheel axles 21 and 23.

Second Embodiment

Figure 8:
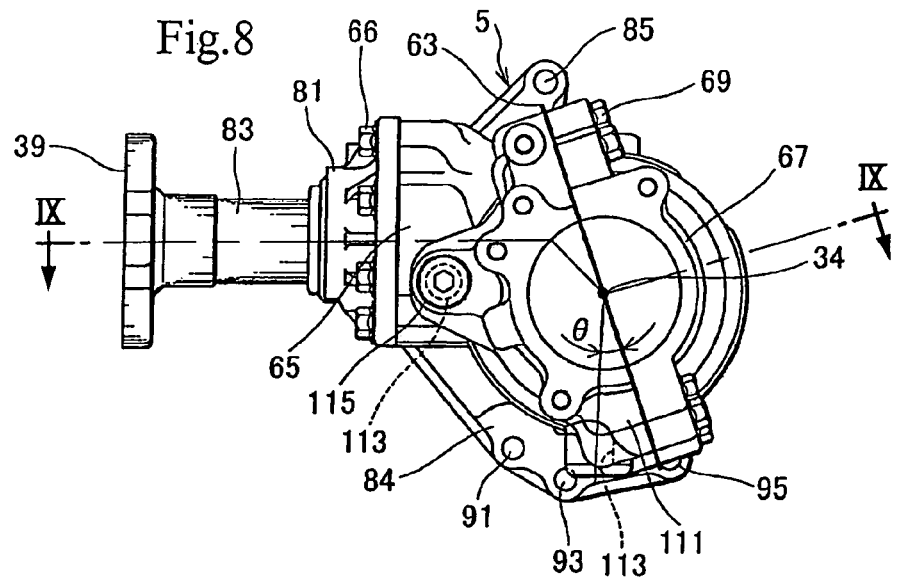
FIG. 8 is a side view showing a power transmission apparatus according to a second embodiment of the present invention.
Figure 9:
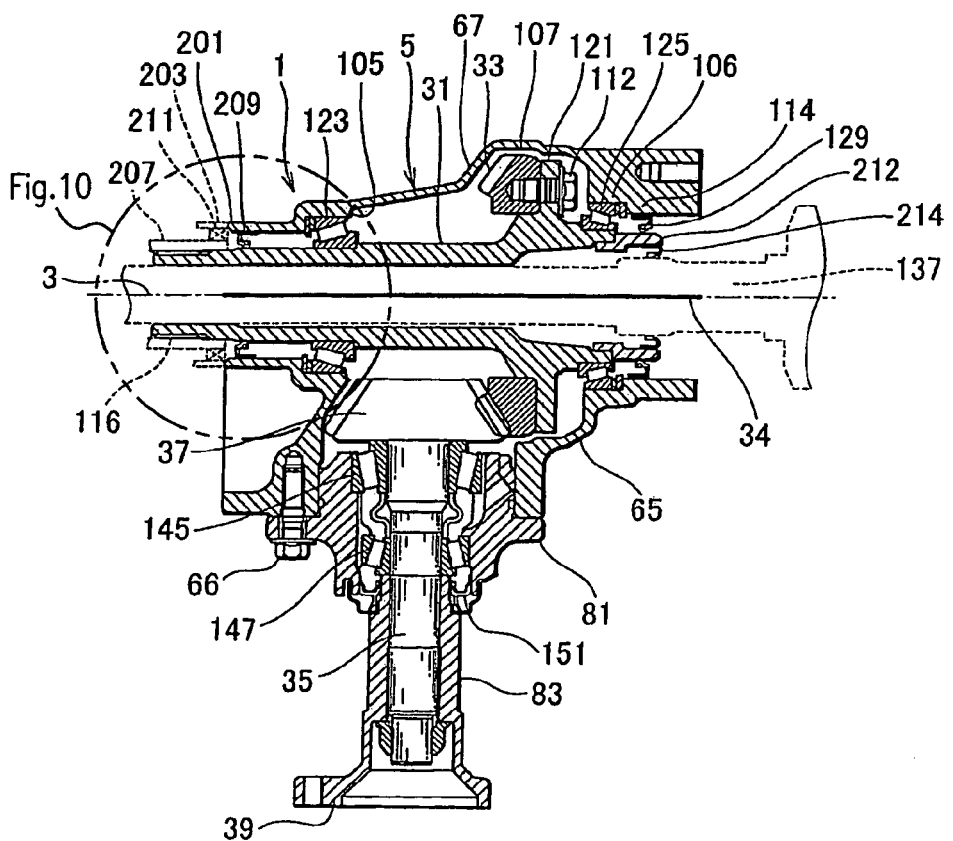
FIG. 9 is a sectional view taken along lines IX-IX of FIG. 8.
Figure 10:
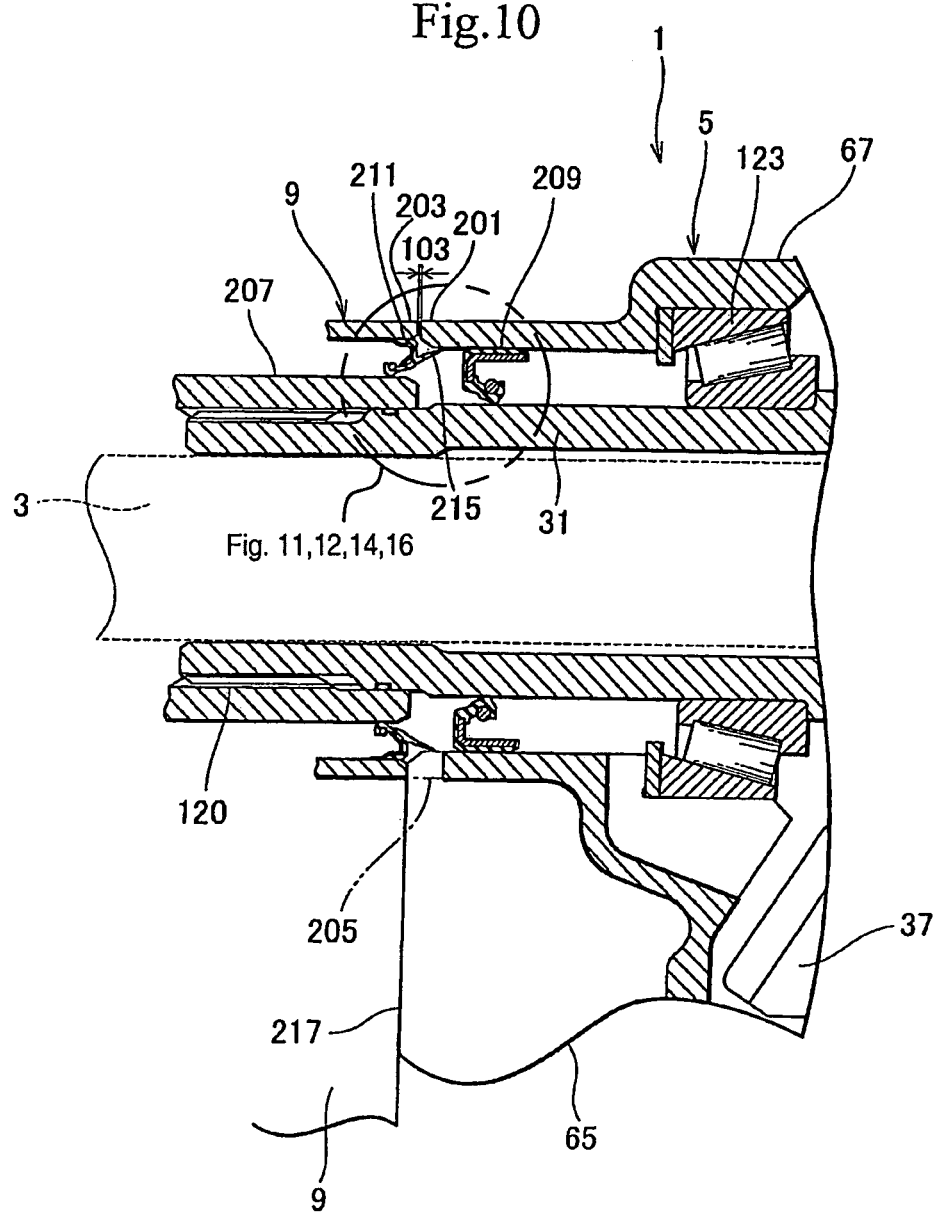
FIG. 10 is an enlarged sectional view showing an end opening of a case of the power transmission apparatus of FIG. 9 as indicated therein.
Figure 11:
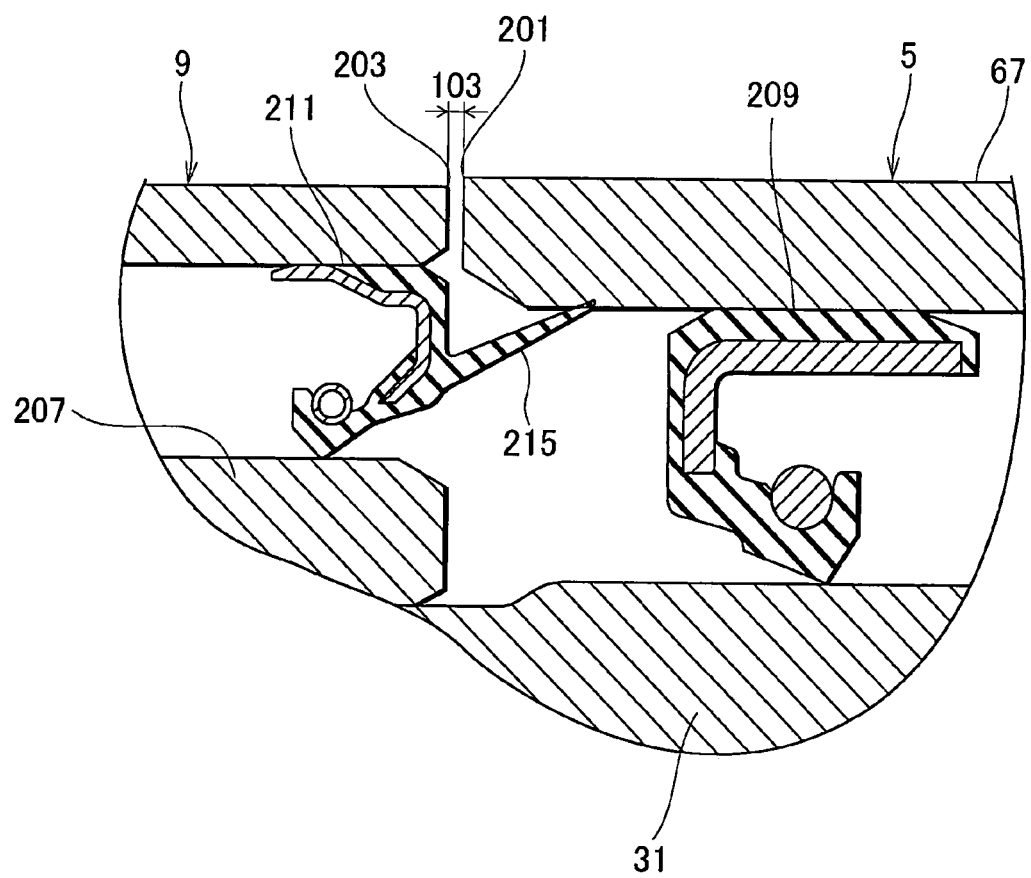
FIG. 11 is an enlarged sectional view showing a seal structure arranged at the end opening of FIG. 10 as indicated therein.

FIG. 8 is a side view showing a power transmission apparatus according to a second embodiment of the present invention, FIG. 9 is a sectional view showing the power transmission apparatus of FIG. 8, FIG. 10 is an enlarged sectional view showing an end opening of a case of the power transmission apparatus of FIG. 8, and FIG. 11 is an enlarged sectional view showing a seal structure arranged at the end opening of FIG. 10. FIGS. 8 and 9 correspond to FIGS. 3 and 4, respectively.

Compared with the first embodiment in the basic structure, the second embodiment has no fourth case part. Except this, the second embodiment is basically the same as the first embodiment. Accordingly, the same or similar parts as those of the first embodiment are represented with the same reference marks in the second embodiment and explanations related to the same or similar parts are omitted.

In FIGS. 8 and 9, first and second case parts 65 and 67 of the second embodiment are fixed together to form a transfer case 5. The transfer case 5 has an end opening 201. The end opening 201 is aligned with an end opening 203 of the bell housing 9 of the transmission 7 corresponding to a fixed lateral. With the openings 201 and 203 aligned with each other, the transfer case 5 is fixed to the bell housing 9. The first case part 65 has a pressure release hole 205 as shown in FIG. 10.

A flange 84 (FIG. 8) of the first case part 65 is fixed to the bell housing 9. At this time, a gap may be formed between the end openings 201 and 203 at the second case part 67. According to the second embodiment, a principal object is to provide a penetration preventive unit that is arranged in order to prevent foreign matter such as water from entering the gap.

In FIGS. 8 to 11, a hollow output member 207 extends from the differential case 17 of the front differential gear 11. An end of the hollow output member 207 is located at the end opening 203 of the bell housing 9 and is engaged through splines with the hollow shaft 31 passing through the transfer case 5.

The hollow output member 207 and hollow shaft 31 form a rotary member passing through the end openings 201 and 203. Between the hollow shaft 31 and hollow output member 207 and the end openings 201 and 203, there are arranged oil seals 209 and 211 forming a seal structure as the penetration preventive unit.

According to the second embodiment, in FIG. 9, the hollow shaft 31 is provided with a separated seal support 212 corresponding to the end 139 of the hollow shaft 31 explained in the first embodiment of FIG. 4. The seal support 212 is engaged with the hollow shaft 31 by, for example, pressure insertion. Along an outer circumference of the seal support 212, an oil seal 129 is arranged. Along an inner circumference of the seal support 212, an oil seal 214 is arranged.

The oil seal 211 arranged on the bell housing 9 side has a side lip 215 that gets in contact with an inner circumference of the end opening 201 of the transfer case 5.

Even if a gap 103 is formed between the second case part 67 and the bell housing 9 at the end openings 201 and 203 due to, for example, an assembling error, the side lip 215 prevents the penetration of outside foreign matter such as water. As a result, no water reaches a sliding part between the oil seal 209 and the hollow shaft 31, thereby protecting the oil seal 209 from the foreign matter.

On the first case part 65, part of the pressure release hole 205 is out of the side lip 215. Since the first case part 65 is tightly attached to the bell housing 9 through an abutting face 217 and is strongly fixed thereto by the flange 84, the pressure release hole 205 is never exposed to the outside. Namely, no foreign matter such as water enters the pressure release hole 205.

Figure 12:
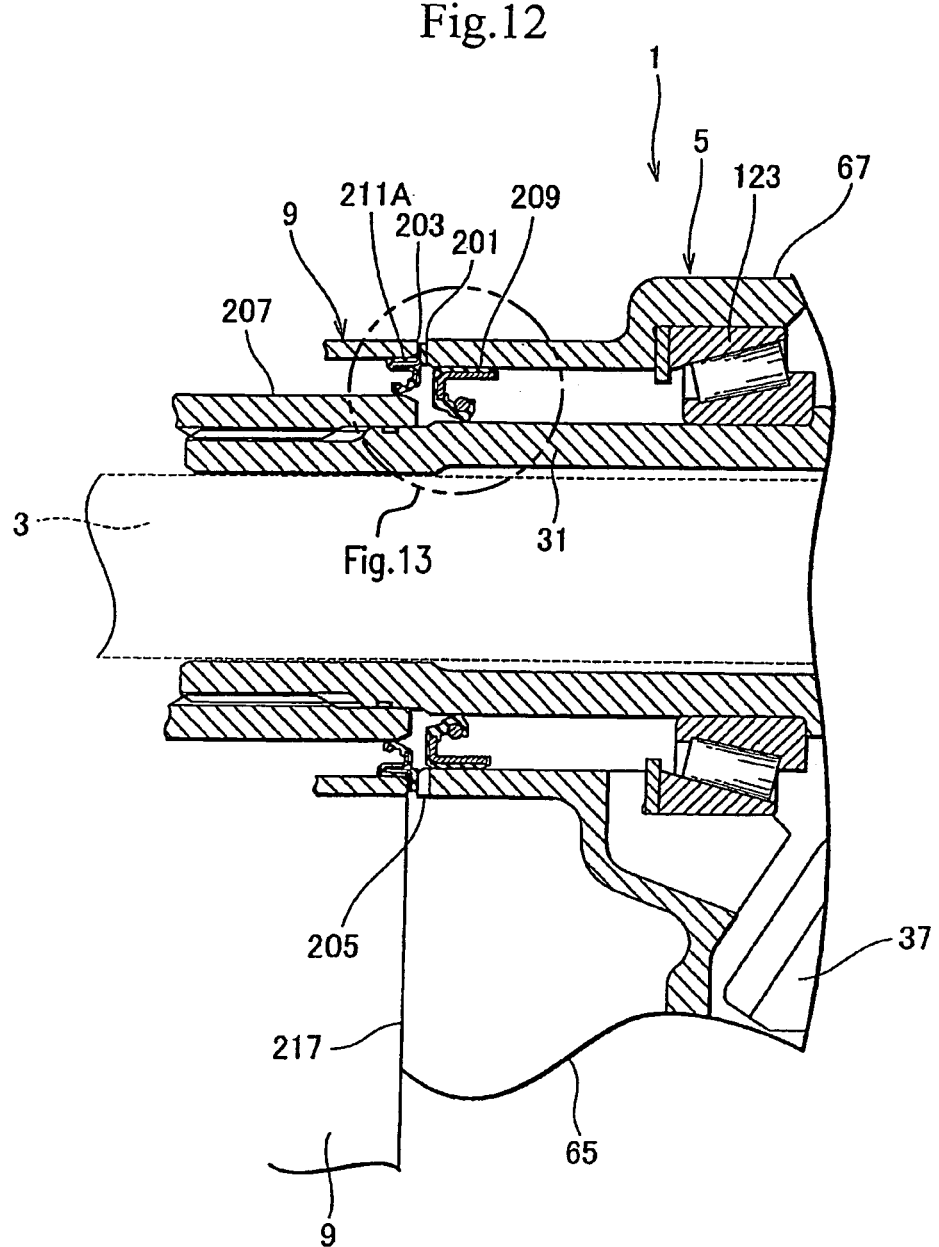
FIG. 12 is an enlarged sectional view showing another seal structure arranged at the end opening of FIG. 10 as indicated therein.
Figure 13:
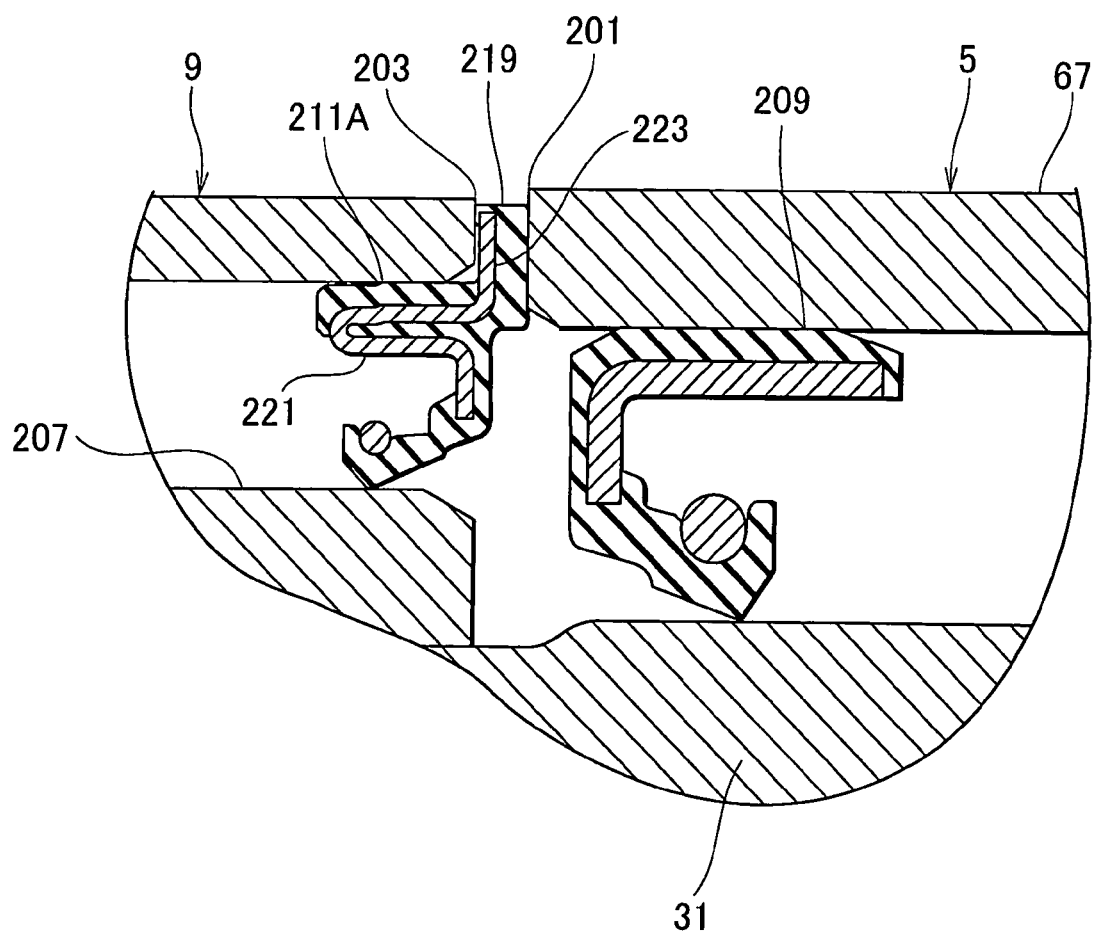
FIG. 13 is an enlarged sectional view showing the seal structure of FIG. 12 as indicated therein.

FIG. 12 is an enlarged sectional view showing another seal structure arranged at the end opening of FIG. 10 and FIG. 13 is an enlarged sectional view showing the seal structure of FIG. 12.

In FIGS. 12 and 13, an oil seal 211A is arranged on the bell housing 9 side. The oil seal 211A has a collar 219 that is interposed between the end openings 201 and 203. The oil seal 211A has a core metal 221 including an extension 223 that extends through the collar 219.

The collar 219 seals a gap between the end openings 201 and 203. Accordingly, even if a gap 103 is formed between the second case part 67 and the bell housing 9 due to, for example, an assembling error, the collar 219 can prevent the penetration of outside foreign matter such as water. Namely, no foreign matter such as water reaches a sliding part between the oil seal 209 and the hollow shaft 31, to thereby protect the oil seal 209 from the foreign matter.

Figure 14:
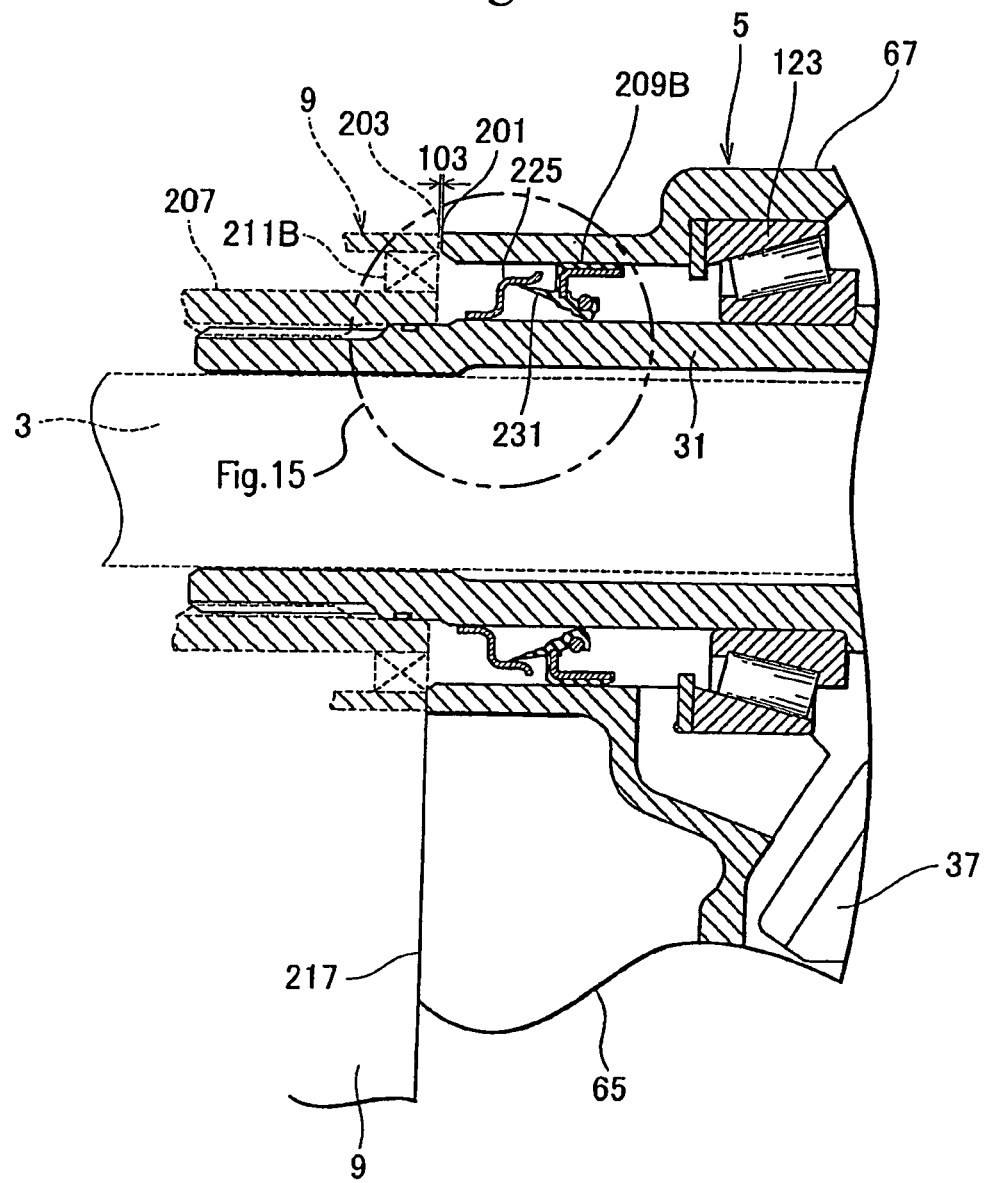
FIG. 14 is an enlarged sectional view showing still another seal structure arranged at the end opening of FIG. 10 as indicated therein.
Figure 15:
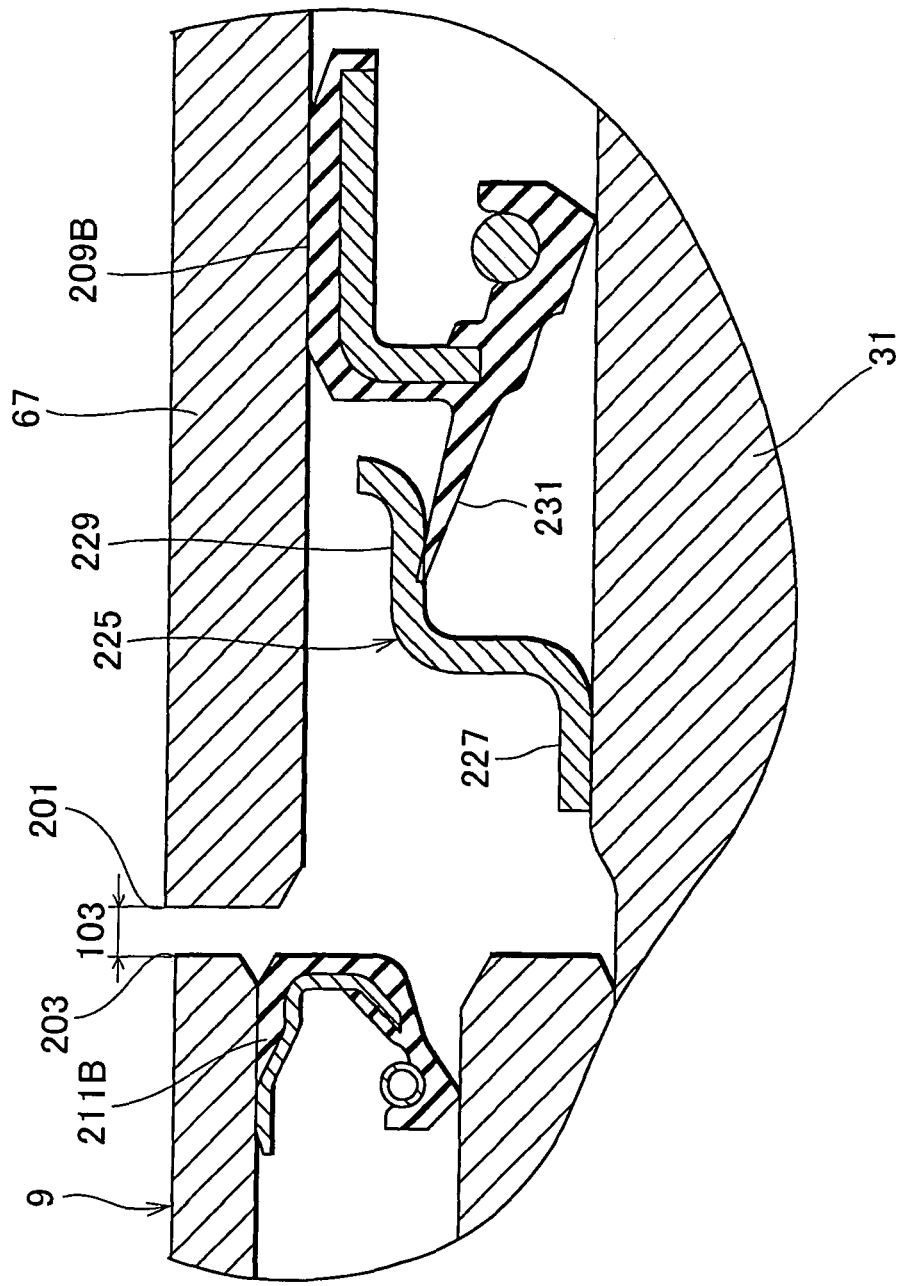
FIG. 15 is an enlarged sectional view showing the seal structure of FIG. 14 as indicated therein.

FIG. 14 is an enlarged sectional view showing still another seal structure arranged at the end opening of FIG. 10 and FIG. 15 is an enlarged sectional view showing the seal structure of FIG. 14.

In FIGS. 14 and 15, a cover ring 225 is arranged around the hollow shaft 31 at the end opening 201 of the transfer case 5. The cover ring 225 has a hook-like section and includes an engaging part 227 and a lip sliding part 229. The engaging part 227 is fixed to the hollow shaft 31.

An oil seal 209B is attached in the end opening 201 of the transfer case 5. The oil seal 209B has a side lip 231 that gets in contact with the lip sliding part 229 of the cover ring 225.

Even if a gap 103 is formed between the second case part 67 and the bell housing 9 due to, for example, an assembling error and even if foreign matter such as water enters the gap, the side lip 231 of the oil seal 209B slides along the lip sliding part 229 of the cover ring 225, to prevent the foreign matter from reaching a sliding part between the oil seal 209B and the hollow shaft 31, thereby protecting the oil seal 209B from the foreign matter.

Foreign matter such as water entering between an oil seal 211B arranged on the bell housing 9 side and the oil seal 209B is properly discharged outside from, for example, a pressure release hole formed on the first case part 65.

Figure 16:
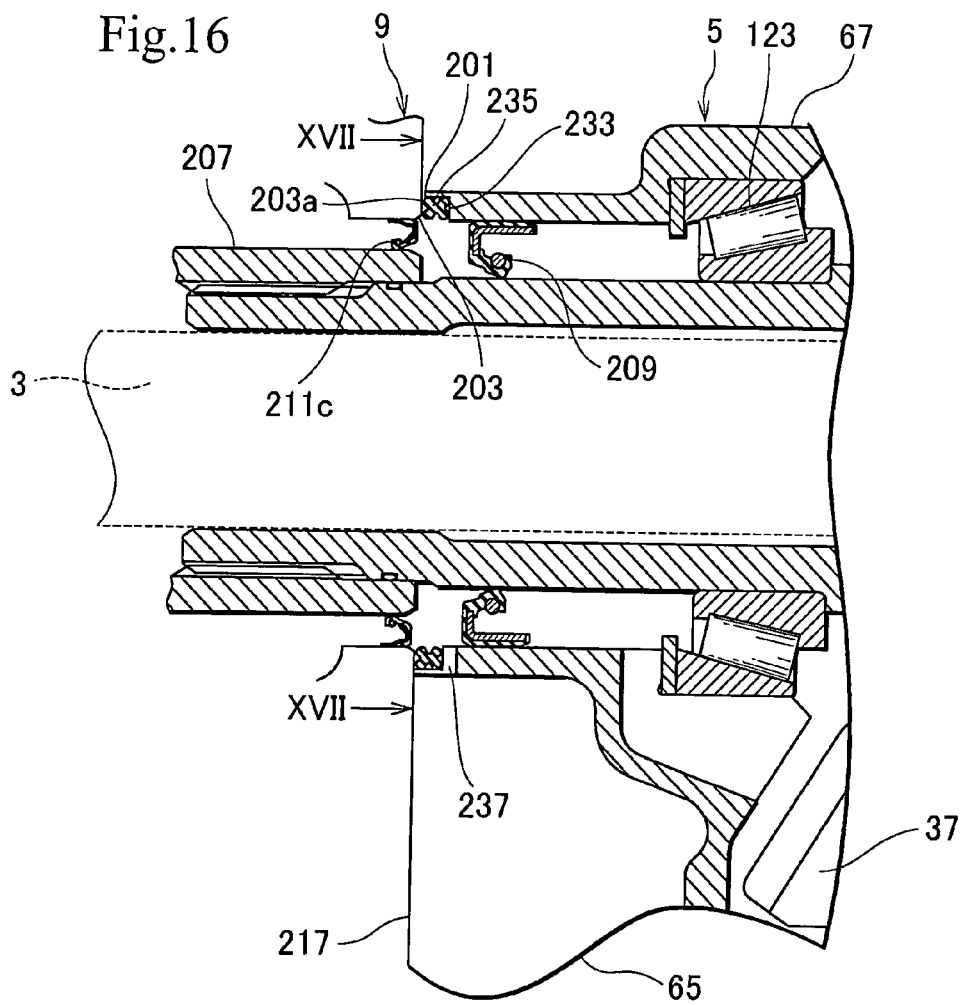
FIG. 16 is an enlarged sectional view showing still another seal structure arranged at the end opening of FIG. 10 as indicated therein.
Figure 17:
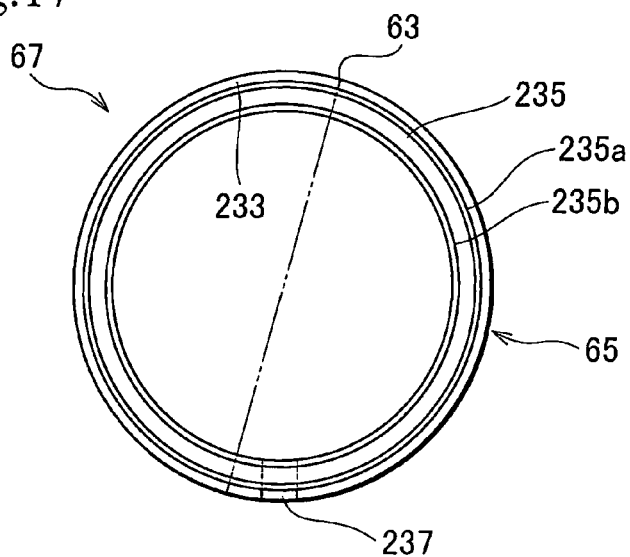
FIG. 17 is a view seen from an arrow XVII of FIG. 16.

FIG. 16 is an enlarged sectional view showing still another seal structure arranged at the end opening of FIG. 10 and FIG. 17 is a view seen from an arrow XVII of FIG. 16.

In FIGS. 16 and 17, an oil seal 211C arranged on the bell housing 9 side has no side lip nor collar unlike the oil seals shown in FIGS. 8 to 13. Instead, the inner circumference of the end opening 201 of the transfer case 5 is provided with a seal supporting recess 233 and an oil seal 235 in the recess 233. The oil seal 235 is an X-seal 235 having an X-shaped section. The oil seal 235 may be an O-ring, a square gasket, a U-gasket, or the like.

The X-seal 235 has contact portions 235a and 235b that are in contact with an edge face 203a of the end opening 203 of the bell housing 9.

The first case part 65 has a cutout 237 that extends the back and periphery of the seal supporting recess 233, to release pressure and water from a space surrounded by the oil seals 209, 211C, and 235. The cutout 237 is positioned at a vertically lowermost location of the end opening 201.

In FIGS. 16 and 17, the contact portions 235a and 235b of the X-seal 235 are in contact with the edge face 203a of the end opening 203, to seal a gap between the end openings 201 and 203. As a result, even if a gap is formed between the second case part 67 and the bell housing 9 due to, for example, an assembling error, the X-seal 235 prevents the penetration of outside foreign matter such as water. Accordingly, no foreign matter reaches a sliding part between the oil seal 209 and the hollow shaft 31, to thereby protect the oil seal 209 from the foreign matter.

The seals shown in FIGS. 16 and 17 are inexpensive, reliable, and durable. Without a side lip or a collar, the oil seal 211C is simple and helps make a compact sealing structure.

Water and the like entering between the oil seals 211C and 209 is drained through the cut 237 of the first case part 65.

In summary, the power transmission apparatus according to each embodiment of the present invention includes the transfer case 5 (carrier case 54) that contains the orthogonal gear set 38 (52) consisting of the first or ring gear 33 (53) and second or pinion gear 37 (drive pinion gear 49) orthogonally meshing with each other. The transfer case 5 (carrier case 54) is divided into the first case part 65 (73) and second case part 67 (75) along the division plane 63 (71) that extends along an axis of rotation of the ring gear 33 (53). The first case part 65 (73) and second case part 67 (75) are fixed together along the division plane 63 (71) with fixing units. This configuration eliminates the need of attaching structures to be radially formed around the first and second case parts so as to protrude in a radial direction away from the wheel axle, the attaching structures being used to fix the divided case parts with bolts. Such radial attaching structures, if formed, interfere with adjacent components. Without such radial attaching structures, the transfer case 5 (carrier case 54) never competes with other components such as the engine 13, fuel tank, cargo room, and body frame for spaces, thereby improving the degree of designing freedom. The present invention, therefore, helps reduce the total size of an assembly including the power transmission apparatus 1 and surrounding components.

The division plane 63 (71) is inclined relative to a vertical direction, to avoid an interference with adjacent components such as the engine 13.

According to the present invention, the transfer case 5 (carrier case 54) is divided into the first case part 65 (73) and second case part 67 (75) along the division plane 63 (71) that extends along an axis of rotation of the ring gear 33 (53) and the first case part 65 (73) and second case part 67 (75) are fixed together along the division plane 63 (71) with fixing units. This configuration, therefore, can conduct to assemble the transfer case 5 easily.

The division plane 63 (71) may be oriented in a vertical direction.

What is claimed is:

1. A power transmission apparatus comprising:
a case configured to house and support first and second gears that orthogonally mesh with each other and form an orthogonal gear set,
a hollow shaft configured to rotate relatively to a rotary shaft that passes through the hollow shaft, the hollow shaft supporting the first gear thereon,
  the case being divided into a first case part and a second case part along a division plane that extends along and intersects an axis of rotation of the first gear, the first and second case parts being fixed together on the division plane with fixing units, the axis of rotation of the first gear extending onto the division plane in the direction of the axis of rotation of the first gear whereas an axis of rotation of the second gear does not so extend onto the division plane in said direction of the axis of rotation of the first gear, and
an oil seal disposed outwardly with respect to the first gear on opposing sides of hollow shaft in a direction along the axis of rotation of the first gear, and interposed between the hollow shaft and the first and second case parts, in which
the first case part includes an attaching portion to be attached to a fixed lateral, and
the second case part is attached to the fixed lateral through the first case part,
  the attaching portion of the first case part including an attaching portion extension extending over the second case part, and
  the attaching portion extension of the attaching portion is fixed to the fixed lateral.

2. The power transmission apparatus of claim 1, wherein: the second case part forms a gap relative to the fixed lateral.

3. A power transmission apparatus comprising:
a case configured to house and support first and second gears that orthogonally mesh with each other and form an orthogonal gear set,
a hollow shaft configured to rotate relatively to a rotary shaft that passes through the hollow shaft, the hollow shaft supporting the first gear thereon and forming a torque receiving connection on an end of the hollow shaft in a direction along an axis of rotation of the first gear,
  the case being divided into a first case part and a second case part along a division plane that extends along and intersects an axis of rotation of the first gear, the first and second case parts being fixed together on the division plane with fixing units, the axis of rotation of the first gear extending onto the division plane in the direction of the axis of rotation of the first gear whereas an axis of rotation of the second gear does not so extend onto the division plane in said direction of the axis of rotation of the first gear, in which
the first case part includes an attaching portion to be attached to a fixed lateral, and
the second case part is attached to the fixed lateral through the first case part,
  the attaching portion of the first case part including an attaching portion extension extending over the second case part, and
  the attaching portion extension of the attaching portion is fixed to the fixed lateral.

4. The power transmission apparatus of claim 3, wherein: the second case part forms a gap relative to the fixed lateral.

* * * * *